3,183,147
PROCESS FOR CONTROLLING NEMATODES WITH PHENYL-DICHLOROVINYL ETHERS
Bernhard Homeyer, Opladen, and Jürgen Johannis, Wuppertal-Elberfeld, Germany, assignors to Farbenfabriken Bayer Aktiengesellschaft, Leverkusen, Germany, a corporation of Germany
No Drawing. Filed May 27, 1964, Ser. No. 370,686
Claims priority, application Germany, June 26, 1963, F 40,077
7 Claims. (Cl. 167—30)

The present invention concerns the application of certain vinyl aryl ethers, which are already known, as nematocides.

It has already been disclosed that 3,4-dichlorophenol-dichlorovinyl ether can be employed as a pest control agent, and in particular as an insecticide (Swiss patent specification No. 255,308).

During tests on the insecticidal power of these phenyl-dichlorovinyl ethers, it was however discovered that their activity is only moderate so that they cannot be considered for practical application as insecticides.

The phenyl-dichlorovinyl ethers only exhibit an extremely low vapour pressure and are practically insoluble in water.

It is an object of the present invention to provide nematocidal agents. A particular object consists in the provision of those nematocidal agents which have a low toxicity towards warm-blooded creatures. Further objects are evident from the following description and the example.

It has now been found that phenyl dichlorovinyl ethers of the formula

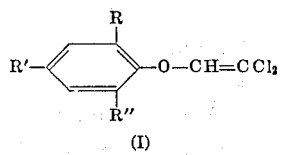

(I)

wherein R, R' and R" denote hydrogen, lower alkyl or halogen, exhibit very strong nematocidal properties.

At the start, a considerable technical prejudice had to be overcome during the tests on the ethers to be employed according to the invention because it had been presumed that substances which exert a nematocidal activity must either exhibit a relatively high vapour pressure or a good solubility in water in order to develop an activity which would be of interest for a practical application. When the phenyl-dichlorovinyl ethers were tested, it was unexpectedly found that they have a very strong activity towards nematodes whilst their toxicity towards insects is only very moderate. At the same time, these compounds exhibit a very good compatibility with plants. The nematocidal agents according to the invention thus constitute a considerable advance in technology.

The dichlorovinyl-phenyl ethers to be employed according to the invention are clearly characterised by the above formula. In this formula, R, R' and R" preferably represent hydrogen, alkyl with 1 to 4 carbon atoms, and chlorine, bromine and fluorine.

The dichlorovinyl-phenyl ethers are already known from the literature (Swiss patent specification Nos. 255,308 and 249,117, as well as United States patent specification No. 2,501,896).

The substances according to the invention have strong nematocidal properties despite their low toxicity towards warm-blooded creatures and can therefore be employed for the control of nematodes, and in particular of phytopathogenic nematodes. These principally include the leaf nematodes (Alphelenchoides) such as the chrysanthemum nematode (A. ritzemabosi), the strawberry nema (A. fragariae) and the rice nematode (A. oryzae); nematodes (Ditylenchus) such as the stick nema (D. dipsaci); root swelling nematodes (Meloidog such as M. arenaria and M. incognita; cyst-forming n todes (Heterodera) such as the potato nematode rostochiensis), the beet nematode (H. schachtii); and the free living root nematodes, for instance from species Pratylenchus, Paratylenchus, Rotylenchus, X inema and Radopholus.

The compounds according to the invention may be ployed by themselves or in the form of the usual ( positions, such as emulsifiable concentrates, spray ] ders, pastes, soluble powders, dusting agents and g ulates.

These are prepared in known manner (cf. Agricul Chemicals, March 1960, pages 35–38). The follo can be mainly considered as assistants for this purp solvents such as aromatic hydrocarbons (for inst xylene, benzene), chlorinated aromatic hydrocarbon instance chlorobenzenes), paraffins (for instance p leum fractions), alcohols (for instance methanol, t nol), amines (for instance ethanolamine, dimethylf amide) and water; carriers such as natural ground erals (for instance caolins, aluminas, talc, chalk) synthetic ground minerals (for instance highly dispe silicic acid, silicates); emulsifying agents such as ionic and anionic emulsifying agents (for instance p ethylene oxide esters of fatty acids, poly-ethylene o ethers of fatty alcohols, alkyl sulphonates and aryl phonates); and dispersing agents such as lignin, s sulphite liquors and methylcellulose.

In these compositions, the compounds accordin the invention may also be present in the form of mixt with other known active agents.

In general, the compositions contain between 0.1 95 percent by weight of the active agent, preferably tween 0.5 and 90 percent.

The ethers to be employed in accordance with invention and their compositions are applied by the mal methods, for instance by watering, spraying, dis ing and furrowing by means of a plough foot, anc jecting.

The following example is given for the purpos illustrating the invention.

EXAMPLE

Test to determine the limiting concentrations

Test nematode_____ Meloidogyne spec.
Solvent_____ 0.4 part by weight of xyl
Emulsifying agent_____ 0.6 part by weight.

In order to prepare a suitable composition of the a agent, 1 part by weight of the active agent is mixed the stated weight of the solvent, the stated weight of emulsifying agent is added, and the concentrate is dil to the required concentration with water.

The composition of the active agent is intimately m with soil which had been strongly infested with test n todes. In this connection, practically no influence is to the concentration of the active agent within the ( position, and only the amount of active agent per volume of soil exerts a decisive influence, this being s in p.p.m. The soil is potted, lettuce is sown in it an pots are maintained at a temperature of 27° C. in a g house. After 4 weeks, the lettuce roots are examine nematode damage, and the degree of activity of the a agent is estimated as a percentage. The degree of a ity is 100% when damage has been completely preve and it is 0% when the extent of the damage is exactl same as that on the control plants in untreated soil w had been infested in the same way.

The concentrations of active agent in the soil and the results are reproduced in the following table:

Table

TEST TO DETERMINE THE LIMITING CONCENTRATIONS

| No. | Active agent | Conc. of active agent as p.p.m. | Degree of activity, as percent |
|---|---|---|---|
| | Cl—⌬—O—CH=CCl₂ | 50 / 25 | 100 / 100 |
| | (Cl ortho)⌬—O—CH=CCl₂ | 50 / 25 | 100 / 100 |
| | Cl—⌬(Cl)—O—CH=CCl₂ | 50 / 25 | 100 / 98 |
| | Cl—⌬(Cl,Cl)—O—CH=CCl₂ | 50 / 25 | 95 / 50 |
| | ⌬—O—CH=CCl₂ | 50 / 25 | 95 / 0 |
| | CH₃—⌬—O—CH=CCl₂ | 50 / 25 | 95 / 90 |

We claim:
1. A method for controlling nematodes which comrises to apply to said nematodes an effective amount of dichlorovinyl-phenyl ether of the formula

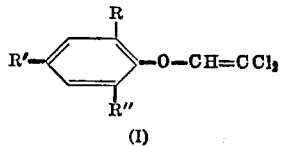

(I)

herein R, R' and R" stand for a member selected from the group consisting of hydrogen, lower alkyl and halogen.
2. A method for controlling nematodes which comprises applying to said nematodes an effective amount of the dichlorovinyl-phenyl ether of the formula

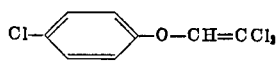

3. A method for controlling nematodes which comprises applying to said nematodes an effective amount of the dichlorovinyl-phenyl ether of the formula

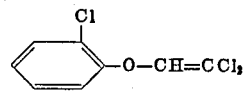

4. A method for controlling nematodes which comprises applying to said nematodes an effective amount of the dichlorovinyl-phenyl ether of the formula

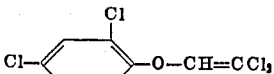

5. A method for controlling nematodes which comprises applying to said nematodes an effective amount of the dichlorovinyl-phenyl ether of the formula

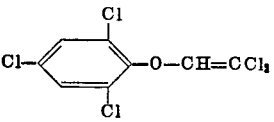

6. A method for controlling nematodes which comprises applying to said nematodes an effective amount of the dichlorovinyl-phenyl ether of the formula

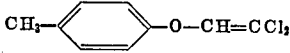

7. A method for controlling nematodes which comprises applying to said nematodes an effective amount of the dichlorovinyl-phenyl ether of the formula

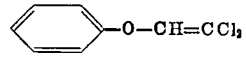

References Cited by the Examiner
UNITED STATES PATENTS
2,501,896   3/50   Graenacher et al. _____ 167—30

FOREIGN PATENTS
249,117   3/48   Switzerland.
255,308   1/49   Switzerland.

LEWIS GOTTS, *Primary Examiner.*